(12) United States Patent
Hosoi

(10) Patent No.: US 7,085,594 B2
(45) Date of Patent: Aug. 1, 2006

(54) PORTABLE TELEPHONE APPARATUS

(75) Inventor: Toshikatsu Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 587 days.

(21) Appl. No.: 09/969,658

(22) Filed: Oct. 4, 2001

(65) Prior Publication Data

US 2002/0039916 A1 Apr. 4, 2002

(30) Foreign Application Priority Data

Oct. 4, 2000 (JP) ............................. 2000-304283

(51) Int. Cl.
*H04M 1/00* (2006.01)
*H04B 1/38* (2006.01)
*H04B 1/16* (2006.01)
*H04B 1/04* (2006.01)

(52) U.S. Cl. ................ 455/572; 455/127.1; 455/127.5; 455/343.2; 455/343.5; 455/574

(58) Field of Classification Search ........ 455/571–574, 455/127.1–127.5, 343.1–343.6; 713/320, 713/340
See application file for complete search history.

(56) References Cited

U.S. PATENT DOCUMENTS

| 4,376,265 A | * | 3/1983 | Kiuchi et al. ................ 324/426 |
| 4,733,265 A | * | 3/1988 | Haraguchi et al. .......... 396/277 |
| 5,485,623 A | * | 1/1996 | Kurokawa et al. ............ 714/22 |
| 5,726,636 A | * | 3/1998 | Hayes, Jr. ................ 340/636.1 |
| 6,445,932 B1 | * | 9/2002 | Soini et al. .............. 455/556.1 |

FOREIGN PATENT DOCUMENTS

| GB | 2 240 010 A | 7/1991 |
| GB | 2 270 445 A | 3/1994 |
| GB | 2 337 898 A | 12/1999 |
| JP | 05-055979 | 3/1993 |
| JP | 05-095324 | 4/1993 |
| JP | 5-77861 | 10/1993 |
| JP | 06-006283 | 1/1994 |
| JP | 6-350748 | 12/1994 |
| JP | 09-055781 | 2/1997 |
| JP | A 9-92245 | 4/1997 |
| JP | 09-139981 | 5/1997 |
| JP | 09-294330 | 11/1997 |
| JP | 11-177481 | 7/1999 |
| JP | A 2000-30679 | 1/2000 |
| JP | A 2000-308144 | 11/2000 |

\* cited by examiner

*Primary Examiner*—George Eng
*Assistant Examiner*—Michael T. Thier
(74) *Attorney, Agent, or Firm*—Young & Thompson

(57) ABSTRACT

The invention provides a portable telephone apparatus wherein, when a necessary voltage is not obtained from a cell because the cell is removed or consumed, data can be backed up with a simple configuration and at a low cost. A cell is removably accommodated in a cell accommodation portion of the body of a portable telephone apparatus, and the cell accommodation portion is closed up with a cell cover. Opening or closing of the cell cover is detected by a switch serving as a cell cover opening/closing detection apparatus in the body, and is outputted as an interrupt signal to a CPU through a control circuit. When the remaining power of the cell becomes little, a cell remaining power detection signal is outputted as another interrupt signal to the CPU through the control circuit. In response to either interrupt signal, stored data of a RAM are transferred to and protected by a flash ROM.

1 Claim, 3 Drawing Sheets

PORTABLE TELEPHONE APPARATUS

BACKGROUND OF THE INVENTION

1. Field of the Invention

The present invention relates to a portable telephone apparatus, and more particularly to a portable telephone apparatus which protects stored contents of an internal memory when power supply from a cell is disconnected instantaneously.

2. Description of the Related Art

It is a significant factor for a portable telephone apparatus to keep a telephone directory, accounting information, data of duration of a call and so forth. Various portable telephone apparatus which protect stored contents of an internal memory when power supply is disconnected instantaneously are known and disclosed, for example, in the following documents.

Japanese Patent Laid-Open No. 55979/1993: Prior Art 1

An interface for allowing information to be read in from an external storage apparatus prepared separately is provided on the body of a portable telephone set such that, even if stored contents of an internal memory are erased, information can be written into the internal memory newly from the external storage thereby to eliminate the necessity for a backup power supply for the internal memory.

Japanese Patent Laid-Open No. 95324/1993: Prior Art 2

A memory is provided in a charger, and upon charging by the charger, information stored in the memory is transferred to an internal memory of a portable telephone apparatus thereby to eliminate the necessity for a backup power supply for the internal memory.

Japanese Patent Laid-Open No. 6283/1994: Prior Art 3

A portable telephone set includes a battery for emergency separate from a battery for use for ordinary call, and a telephone number for emergency call is registered in advance in an internal memory backed up by a backup battery. If the registered telephone number for emergency call is inputted, then the power supply is changed over from the battery for ordinary call to the battery for emergency call thereby to allow emergency call even if the battery for ordinary call is consumed.

Japanese Patent Laid-Open No. 55781/1997: Prior Art 4

A buffer memory, an EEPROM (Electrically Erasable Programmable Read Only Memory), a voltage holding capacitor and a voltage detection circuit for detecting the voltage of a power supply cell are provided in the body of a portable telephone set. During a call, data to be stored are written into the buffer memory, and when the call comes to an end, the data written in the buffer memory are transferred to the EEPROM. If the voltage detection circuit detects that a necessary voltage is not obtained from the cell because the cell is removed or consumed, the buffer memory and the EEPROM are operated with the voltage held by the capacitor to transfer the data written in the buffer memory to the EEPROM.

Japanese Patent Laid-Open No. 139981/1997: Prior Art 5

A telephone number of the call origination side is stored, during a call, into an EEPROM so that it may be maintained even if the call is interrupted because of exhaustion of a cell. Then, when the power supply becomes available as a result of replacement of the cell with a new cell, the telephone number is read out from the EEPROM and displayed on a display section.

Japanese Patent Laid-Open No. 294330/1997: Prior Art 6

The number of voltage variations of a backup cell is counted, and the life of the backup cell is estimated from the count value and conveyed to the user.

Japanese Patent Laid-Open No. 177481/1999: Prior Art 7

A portable telephone set includes a main battery, a backup battery for backing up an SRAM (static random access memory) which stores a telephone number, a voltage detector for detecting the voltage of the main battery and causing a CPU to perform system resetting when it detects the lowest operating voltage, and a switch element. Upon system resetting, the switch element is switched off thereby to prevent a voltage drop by reverse current to assure the backup for the SRAM and so forth.

Most portable telephone apparatus include a cell and a cell cover formed as a unit. In a portable telephone apparatus of the type just mentioned, the cell is removed inadvertently by a shock upon replacement or when the cell cover is dropped. Therefore, an SRAM (static random access memory) which maintains its stored data as long as power is supplied thereto is used and backed up by a primary or secondary cell to protect the stored data so that they may not be lost inadvertently.

The backup current for an SRAM is approximately 1 µA and very low. In contrast, the backup current for a DRAM (dynamic random access memory) which is less expensive is approximately 100 µA and comparatively high. Consumption of high current decreases the life of a cell of a telephone apparatus. Therefore, it is obliged to avoid replacement of an SRAM with a DRAM.

Meanwhile, where a cell and a cell cover are formed as a unit, cell covers of different colors must be prepared for different colors for the body of a portable telephone apparatus, and the number of parts to be managed becomes great as much. If the cell and the cell cover are formed so as to be separable from each other or formed as separate parts, then the number of parts to be managed depending upon the different colors can be reduced. Further, in recent years, as a result of popularization of the Internet, a portable telephone apparatus has become popularized which has a higher performance as a result of incorporation of a browser function (software for accessing the Internet) or as a result of additional incorporation of a color display function and therefore requires an internal memory of a large capacity. However, since the price competition is very keen, it is demanded to use electronic parts of reduced costs.

In the portable telephone set of the Prior Art 4 (Japanese Patent Laid-Open No. 55781/1995) from among the prior art documents given hereinabove, if a necessary voltage is not obtained from a cell because the cell is removed or consumed, then the buffer memory and the EEPROM are operated with the voltage held by the voltage holding capacitor to transfer the data written in the buffer memory to the EEPROM as described above. Therefore, a DRAM can be used for the buffer memory. However, since a capacitor of a high capacitance is required as the voltage holding capacitor, this makes miniaturization of the portable telephone set difficult. Besides, even if a capacitor of a high capacitance is used, since this allows backup of data only of several tens bytes, it cannot be used to back up information of a great amount of data such as a telephone directory which likely contains data of several tens kilobytes.

SUMMARY OF THE INVENTION

It is an object of the present invention to provide a portable telephone apparatus wherein, when a necessary voltage is not obtained from a cell because the cell is removed or consumed, data can be backed up with a simple configuration and at a low cost.

The present invention has been made from the points of view that a cell and a cell cover are preferably formed as separate parts and that a considerable interval of time is available after the cell cover is opened until the cell is removed. Thus, in order to attain the object described above, according to the present invention, there is provided a portable telephone apparatus, comprising a body having an accommodation portion capable of accommodating a cell serving as a power supply therein, a cell cover removably attached to the body for opening and closing the accommodation portion, a volatile memory which requires backup by the cell, a non-volatile memory which does not require backup by the cell, cell cover opening/closing detection means for detecting opening or closing of the cell cover with respect to the accommodation portion of the body, and transfer means for transferring stored contents of the volatile memory to the non-volatile memory when opening of the cell cover is detected by the cell cover opening/closing detection means.

The cell cover opening/closing detection means may include a switch which is switched on or off when the cell cover opens or closes the accommodation portion of the body or alternatively may include a Hall effect element or a reed relay which is operated by a magnet provided on the cell cover.

Preferably, the portable telephone apparatus further comprise cell remaining power detection means provided on the body for detecting a remaining power of the cell and outputting a cell remaining power detection signal when the remaining power of the cell decreases to a predetermined value. In this instance, the transfer means transfers the stored contents of the volatile memory to the non-volatile memory when the cell remaining power detection signal from the cell remaining power detection means is inputted to the transfer means.

Where the volatile memory is a RAM and the non-volatile memory is a flash ROM, when the cell cover opening/closing detection means detects opening of the cell cover or when the cell remaining power detection signal from the cell remaining power detection means is inputted to the transfer means, the transfer means transfers the stored contents of the RAM to the flash ROM by an interrupt process by a CPU. The volatile memory may be a DRAM. Therefore, in the portable telephone apparatus, a DRAM and a flash ROM which are less expensive can be used for the memory for keeping data in place of an expensive SRAM.

The transfer means may include a circuit for producing an interrupt signal to the CPU from a cell cover opening detection signal from the cell cover opening/closing detection means and the cell remaining power detection signal from the cell remaining power detection means.

Preferably, the portable telephone apparatus further comprises a display section provided on the body for displaying a warning when the cell remaining power detection signal is outputted from the cell remaining power detection means.

The portable telephone apparatus achieves the following advantages in practical use. In particular, since data of the volatile memory, that is, a RAM, are transferred to and protected by the non-volatile memory, that is, flash ROM before the cell is disconnected instantaneously, it is not necessary to maintain the data in the RAM. Further, since opening/closing of the cell cover can be detected by the cell cover opening/closing means of a comparatively simple configuration, no considerable effect is had on the cost. Furthermore, ID information of a portable telephone apparatus is information unique to the portable telephone apparatus and must always be maintained, and the ID information is usually stored in a flash ROM. Therefore, the flash ROM used in the present portable telephone apparatus does not make a factor of increase of the cost. Accordingly, it is not necessary to normally back up data in the RAM with the cell, and therefore, a less expensive DRAM can be used as the RAM, that is, the volatile memory. Since various factors of increase of the cost are eliminated in this manner, reduction of the cost can be anticipated. Furthermore, even if the cell is disconnected, it is not necessary to continue supply of power to the RAM, and therefore, a cell for exclusive use for backing up the RAM is not required and the cost can be reduced as much.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
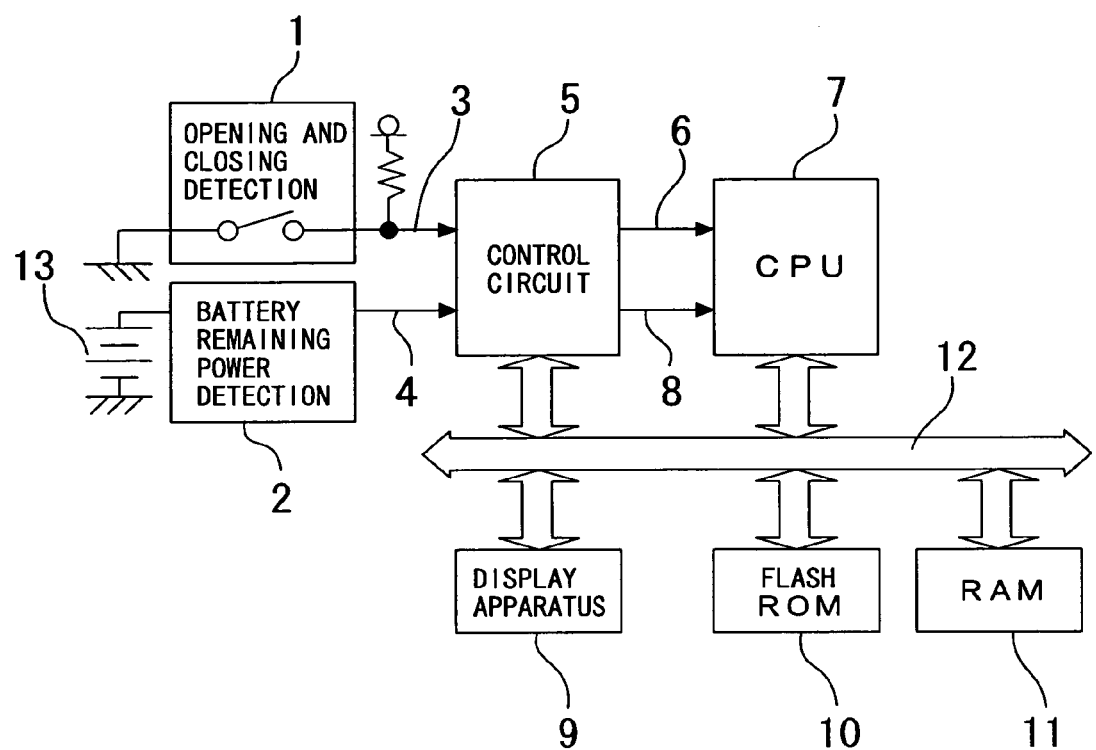
FIG. 1 is a block diagram showing an electric configuration of a portable telephone apparatus to which the present invention is applied.

Referring first to FIG. 1, there is shown an electric configuration of a portable telephone apparatus to which the present invention is applied. The portable telephone apparatus shown includes a cell 13 serving as a power supply, a cell cover opening and closing detection apparatus 1 for detecting opening and closing of a cell cover (not shown in FIG. 1) separate from the cell 13, a cell remaining power detection apparatus 2, a control circuit 5, a CPU (central processing unit) 7, a display apparatus 9, a flash ROM 10 which is a non-volatile memory, a RAM 11 which is a volatile memory, and a bus 12.

The cell cover opening and closing detection apparatus 1 detects removal or opening of the cell cover before the cell 13 is removed, that is, before power supply by the cell 13 is disconnected, and outputs a cell cover opening/closing detection signal 3. The cell remaining power detection apparatus 2 outputs a cell remaining power detection signal 4 when the remaining power of the cell 13 decreases below a predetermined value. The cell cover opening/closing detection signal 3 outputted from the cell cover opening and closing detection apparatus 1 and the cell remaining power detection signal 4 outputted from the cell remaining power detection apparatus 2 are inputted to the control circuit 5. Further, an interruption signal 6 and another interruption signal 8 corresponding to the signals 3 and 4, respectively, are outputted from the control circuit 5 to the CPU 7.

The CPU 7 receives the interruption signal 6 representative of opening of the cell cover and performs operation of writing data stored in the RAM 11 into the flash ROM 10 before the cell 13 is removed and the power supply is disconnected. The flash ROM 10 can maintain data even if there is no power supply thereto. Since at least several seconds are taken after removal of the cell cover till disconnection of the cell 13, the data can be transmitted from the RAM 11 to the flash ROM 10 sufficiently in time.

Further, if the remaining power of the cell 13 decreases below the predetermined value, then this is detected by the cell remaining power detection apparatus 2. Consequently, data stored in the RAM 11 in advance can be written into the flash ROM 10 before the remaining power of the cell is used up. In this instance, a warning that the remaining power of the cell 13 is little can be given to the user by means of the display apparatus 9. Further, updating of the data of the RAM 11 after the cell is removed is not performed. Accordingly, the necessity to protect data stored in the RAM 11 is eliminated. Consequently, the necessity to use a high price SRAM is eliminated, and the RAM 11 can be replaced by a low price DRAM. In other word, the RAM 11 can be formed not from an SRAM but from a DRAM.

Figure 2:
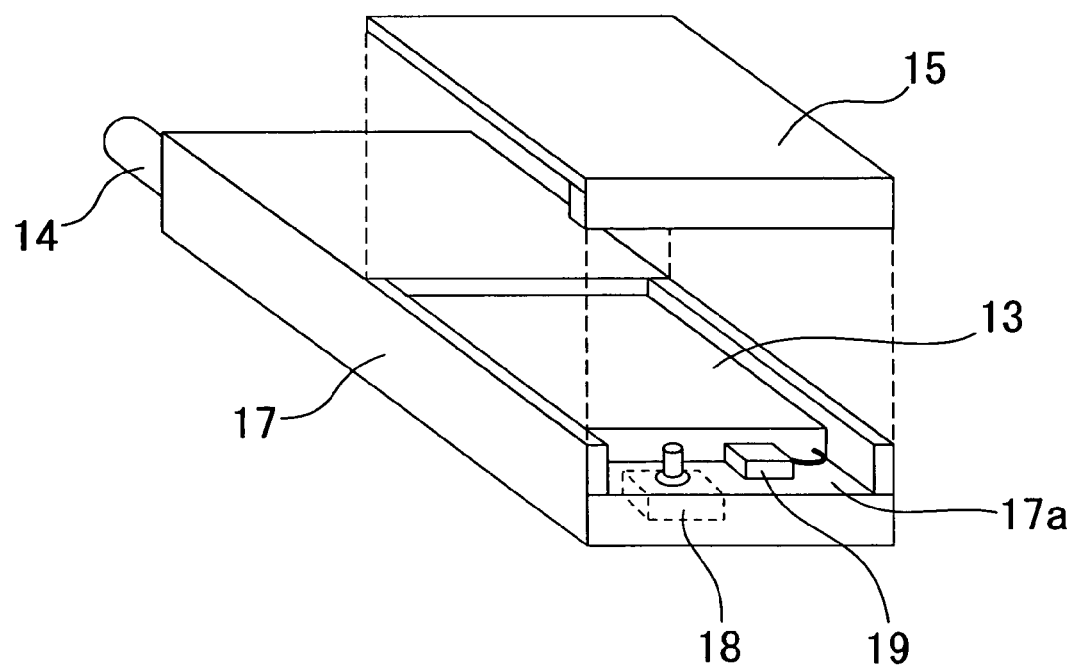
FIG. 2 is a perspective view showing a mechanical configuration of the portable telephone apparatus to which the present invention is applied.

Referring now to FIG. 2, there is shown a mechanism of part of the portable telephone apparatus to which the present invention is applied. The portable telephone apparatus includes an antenna 14 provided at an end of a body 17 of a generally thin substantially rectangular parallelepiped, and a cell accommodation section 17*a* is provided at an internal portion of a rear face of the body 17 remotely from the antenna 14. A thin cell 13 is removably accommodated in the cell accommodation section 17*a*, and the cell accommodation section 17*a* is closed with a cell cover 15 with the cell 13 accommodated therein. The cell cover 15 is freely attached to or removed from the body 17. When the cell storage section 17*a* is closed, the cell cover 15 forms part of the rear face and part of an end face of the body 17. A power supply connector 19 to be connected to the cell 13 and a mechanical switch 18 of a cell cover opening and closing detection apparatus are provided in the cell accommodation section 17*a*.

The switch 18 has an off state when the cell cover 15 is closed, but the switch 18 has an on state when the cell cover 15 is opened. Consequently, opening or closing of the cell cover 15 is detected. Further, the cell 13 is connected to the power supply connector 19 in order to supply operation power to the electronic circuit provided in the body 17. Even if the cell cover 15 is opened, since the cell 13 is connected to the power supply connector 19, the power supply is not disconnected at once. That is, in order to disconnect the power supply, it is necessary for the user to first remove the cell cover 15 from the body 17 and then cut the connection between the cell 13 and the power supply connector 19.

In the following, operation of the portable telephone apparatus is described with reference to FIGS. 1 and 2. In a state wherein the cell cover 15 of FIG. 2 is closed, the switch 18 of the cell cover opening and closing detection apparatus is off and the cell cover opening/closing detection signal 3 to be supplied to the control circuit 5 of FIG. 1 has the High level. Meanwhile, if the cell cover 15 is opened, then the switch 18 is switched on, and the cell cover opening/closing detection signal 3 to be supplied to the control circuit 5 of FIG. 1 exhibits the Low level and the interruption signal 6 is transmitted from the control circuit 5 to the CPU 7. The CPU 7 thus discriminates that the cell cover 15 is removed, and writes the data of the RAM 11 into the flash ROM 10.

Similarly, if the cell remaining power detection apparatus 2 detects a state wherein the amount of the cell 13 is little, then the cell remaining power detection signal 4 of the cell remaining power detection apparatus 2 is transmitted as the interruption signal 8 to the CPU 7 through the control circuit 5. The CPU 7 discriminates that the cell remaining power is little and writes the data of the RAM 11 into the flash ROM 10. A warning to the user when the cell remaining power is little is given, for example, by blink displaying a mark of a cell or emitting warning sound. Since such warning is well known to those skilled in the art, detailed description of the warning is omitted herein.

Figure 3:
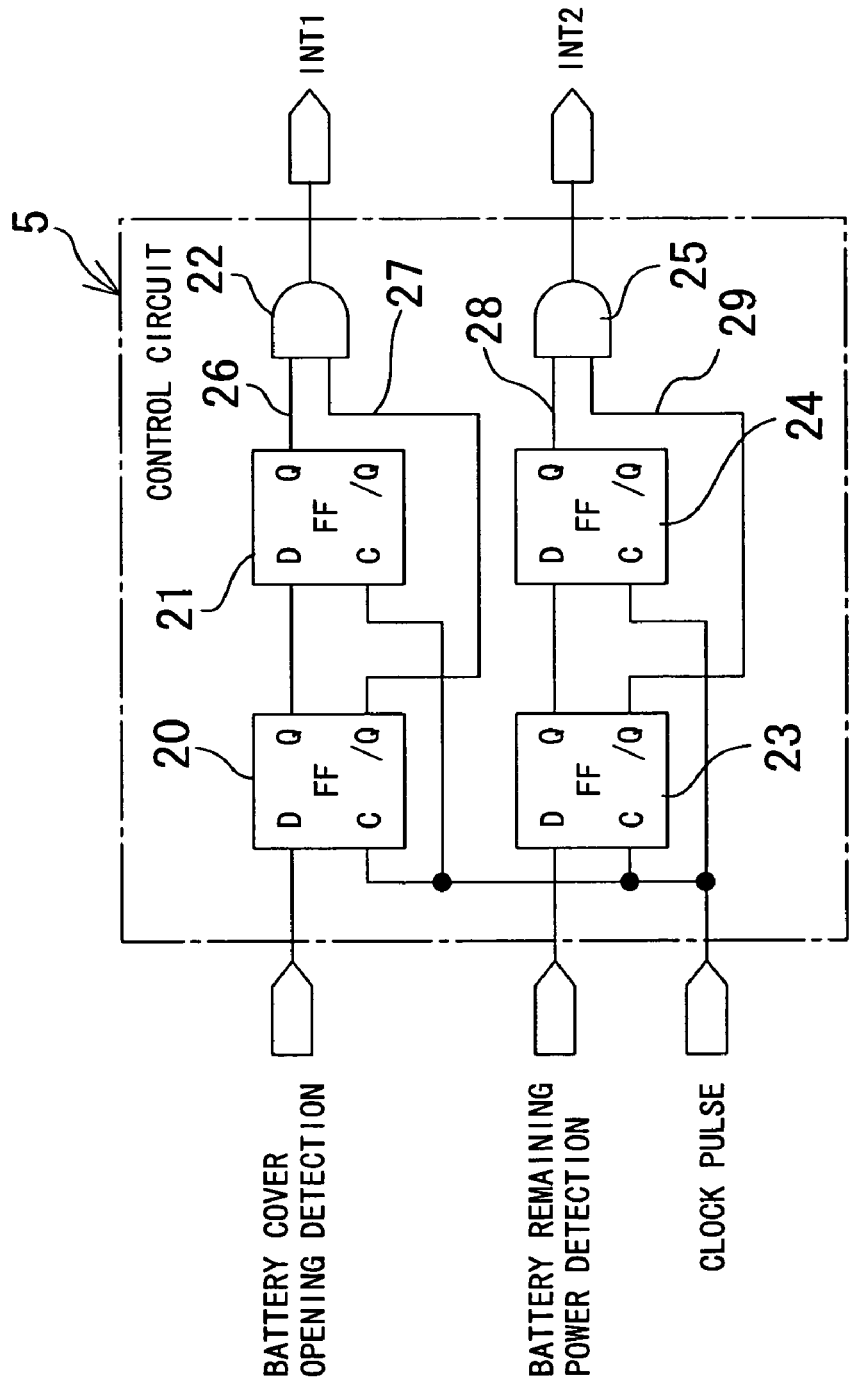
FIG. 3 is a block diagram showing a detailed configuration of a control circuit shown in FIG. 1.

A particular example the control circuit 5 is shown in FIG. 3. Referring to FIG. 3, the control circuit 5 includes four flip-flop circuits 20, 21, 23, and 24 and two AND gates 22 and 25. Each of the flip-flop circuits 20, 21, 23, and 24 has an input terminal D to which data is inputted, a clock input terminal C to which a clock pulse is inputted, an output terminal Q, and an inverted output terminal /Q.

The cell cover opening/closing detection signal 3 of the cell cover 15 is inputted to the input terminal D of the flip-flop circuit 20, and the clock pulse is inputted to the clock input terminal C. An output of the output terminal Q of the flip-flop circuit 20 is inputted to the input terminal D of the flip-flop circuit 21. An output signal 27 of the inverted output terminal /Q of the flip-flop circuit 20 and an output signal 26 of the output terminal Q of the flip-flop circuit 21 are inputted to the CPU 7 through the AND gate 22. When the input signal to the control circuit 5 which is the opening/closing detection signal 3 regarding the cell cover 15 changes from the High level to the Low level, the control circuit 5 generates a High pulse. The pulse is inputted to the CPU 7 as the interruption signal 6.

Also the cell remaining power detection signal 4 is inputted to the control circuit 5. The cell remaining power detection signal 4 is inputted to the input terminal D of the flip-flop circuit 23 of the control circuit 5 shown in FIG. 3. The clock pulse is inputted to the clock terminal C of the flip-flop circuit 23. An output signal of the output terminal Q of the flip-flop circuit 23 is inputted to the input terminal D of the flip-flop circuit 24. An output signal 29 of the inverted output terminal /Q of the flip-flop circuit 23 and an output signal 28 of the output terminal Q of the flip-flop circuit 24 are inputted to the CPU 7 through the AND gate 25. When the cell remaining power detection signal 4 changes from the High level to the Low level, the control circuit 5 generates a High pulse and transmits it as the interruption signal 8 to the CPU 7. The CPU 7 breaks the process being performed at present in response to the interruption signal 6 or 8 inputted thereto and transfers only those data, which are necessary to be maintained, from the RAM 11 to flash ROM 10. Upon transfer of the data, the data are read from the RAM 11 through the bus 12 and are written into the flash ROM 10 through the bus 12. In this manner, the data of the RAM are written into and protected by the flash ROM 10.

While a preferred embodiment of the present invention has been described using specific terms, such description is for illustrative purposes only, and it is to be understood that changes and variations may be made without departing from the spirit or scope of the following claims. For example, while the portable telephone apparatus of the embodiment described above uses a mechanical switch as the cell cover opening/closing detection apparatus 1, any other detection element may be used only if it produces a detection signal when the cell cover is opened or closed. For example, a magnet may be mounted at a predetermined position of the cell cover 15 such that opening or closing of the cell cover 15 is detected by means of a Hall element or a reed relay which cooperates with the magnet.

What is claimed is:

1. A portable telephone apparatus, comprising:

a body for removably accommodating a cell therein;

a cell cover mounted for opening and closing motion on said body for covering the cell;

a volatile memory provided in said body;

a non-volatile memory provided in said body;

a cell remaining power detection section provided in said body for detecting a remaining power of the cell and outputting a cell remaining power detection signal;

a cell cover opening/closing detection section provided in said body for detecting opening or closing of said cell cover;

a display section provided on said body;

a control circuit provided in said body for generating an interruption signal of cell remaining power detection when the cell remaining power detection signal is received from said cell remaining power detection section and generating an interruption signal of cell cover opening when a cell cover opening signal is received from said cell cover opening/closing detection section; and a CPU provided in said body and adapted to interrupt, when the interruption signal of cell remaining power detection is received from said control circuit, a process being currently performed by said CPU and then transfer only those data which require retention from said volatile memory to said nonvolatile memory and control said display section to display a warning, whereafter said CPU disables later updating of said volatile memory, said CPU being further adapted to interrupt, when the interruption signal of cell cover opening is received from said control circuit, a process being currently performed by said CPU and then transfer only those data which require retention from said volatile memory to said non-volatile memory.

* * * * *